Aug. 2, 1932. W. S. LONG 1,870,180
PUMP RIG
Filed March 21, 1930
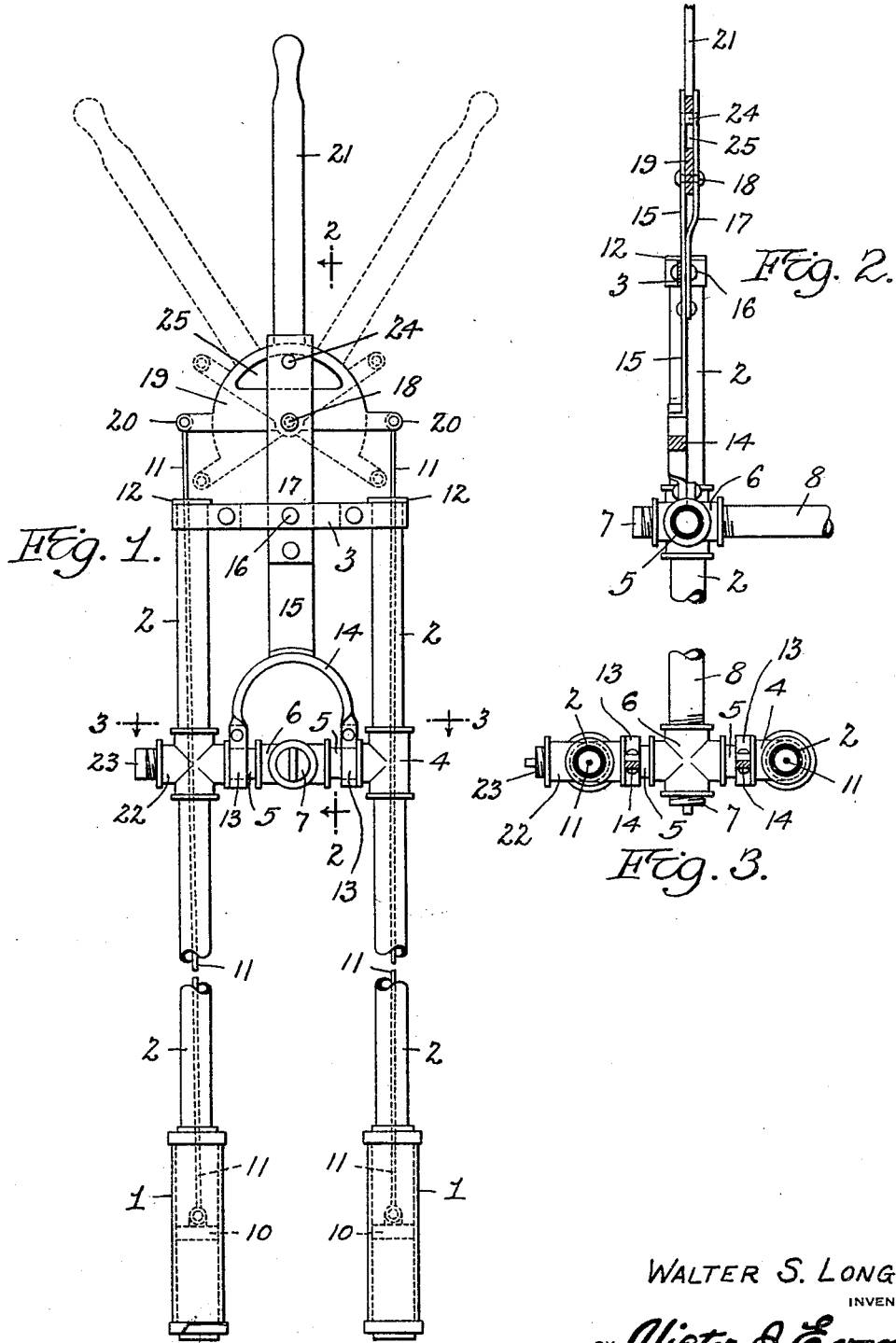
WALTER S. LONG
INVENTOR
BY Victor J. Evans
ATTORNEY
WITNESS Lee Smith Patented Aug. 2, 1932

1,870,180

UNITED STATES PATENT OFFICE

WALTER S. LONG, OF JEFFERS, MONTANA

PUMP RIG

Application filed March 21, 1930. Serial No. 437,885.

My present invention has reference to a double cylinder pump rig and has for its object the provision of a handle operated pump of a construction whereby a maximum amount of water will be elevated and discharged from the pump with a minimum amount of physical exertion upon the part of the operator.

To the attainment of the foregoing and other objects which will present themselves, the invention consists in the improvement hereinafter described and definitely claimed.

In the drawing:

Figure 1 is a side elevation of a pump in accordance with this invention.

Figure 2 is a sectional view approximately on the line 2—2 of Figure 1.

Figure 3 is a sectional view approximately on the line 3—3 of Figure 1.

As disclosed by the drawing I employ a pair of spaced cylinders 1 to whose upper ends there are connected the well pipes or barrels 2. The upper ends of the barrels are connected together and held in spaced relation by a brace member 3. The barrels are also connected together by short pipes screwed in suitable couplings 4 and screwed in the ends of the short pipes 5 there is a cross coupling 6. One of the lateral branches of the cross coupling is closed by a plug, as at 7, and the other pipe has screwed therein the end of a discharge pipe 8. One (or both) of the couplings 4 is in the nature of a cross and has its outer longitudinal branch 22 closed by a plug 23. When the plug is removed a water outlet pipe is screwed in this branch 22 of the coupling, as will hereinafter be apparent.

In each of the cylinders there is a plunger 10 and to each of the plungers is connected a plunger rod 11. The plunger rods preferably pass through suitable stuffing boxes 12 in the top of the barrels 2.

There is connected to the short pipes 5 clamps 13, and to the ends of these clips there is connected a yoke 14. To the top of the yoke there is fixed the vertically arranged plate 15 that passes centrally through the brace 3 and is riveted or otherwise secured thereto, as indicated by the numeral 16. The plate 15 has fixed upon one of its faces the lower end of a second and shorter plate in the nature of a bracket 17. The bracket is spaced from the plate 15 and there is pivoted, as at 18, between the plate and bracket a segmental head member 19. The member 19 has lateral extensions 20 in the nature of short arms to which the plunger rods 11 are pivotally connected. The segmental member 19 has centrally and integrally formed therewith a handle extension 21. A pin 24 is secured between the bracket plates 15 and 17 and passes through an arcuate slot 25 in the segmental head 19. The pin, contacting with the end walls provided by the slot 25 limits the swinging of the handle 21 in both directions. Obviously by imparting a reciprocatory movement to the handle 21 a reciprocatory movement will be imparted to the plungers 10 so that water will be forced upwardly through one of the barrels into the connecting pipe between the barrels and out of the outlet pipe 8. The outlet pipe it should be stated should be arranged to be screwed in either of the lateral branches of the cross coupling 6 so that water can be directed from either side of the pump. With the improvement it will be noted that the water will be continuously raised and a continuous flow will be let through the outlet pipe 8 or through a pipe screwed in the branch 22 of the coupling 4, or through both of such pipes. The construction is extremely simple and the operation and advantages thereof will, it is thought, be understood and appreciated without further detailed description. I believe, however, it necessary to state that I do not wish to be restricted to the precise details herein set forth and, therefore, hold myself entitled to make such changes therefrom as fairly fall within the scope of what I claim:

Having described the invention, I claim:

In combination with a pair of spaced barrels connected together by a cross coupling, a pump rig comprising a brace member attached to the barrels above the cross coupling, a yoke mounted upon the cross coupling and having an upwardly extending plate disposed between the barrels, said plate being connected with the brace member, a segment head pivoted to the plate and having a slot, a pin carried by the plate and entering said slot, plunger rods pivotally connected with the ends of the segment plate and entering the barrels, said segment plate having a handle extension located midway between the ends thereof.

In testimony whereof I affix my signature.

WALTER S. LONG.